United States Patent [19]

Shortt et al.

[11] Patent Number: 5,312,126
[45] Date of Patent: May 17, 1994

[54] PORTABLE GOLF CART AND RIDING APPARATUS

[75] Inventors: Douglas B. Shortt; Mark J. Lumbard, both of Calgary, Canada

[73] Assignee: Pro-Lite Manufacturing, Inc., Calgary, Canada

[21] Appl. No.: 52,911

[22] Filed: Apr. 27, 1993

[51] Int. Cl.⁵ ............................................. B62M 1/00
[52] U.S. Cl. .............................. 280/287; 280/DIG. 6; 180/208
[58] Field of Search ............... 180/208, 65.2; 280/282, 280/278, 287, DIG. 5, DIG. 6

[56] References Cited

U.S. PATENT DOCUMENTS

| | | | |
|---|---|---|---|
| 3,354,975 | 11/1967 | Stuart | 180/208 |
| 3,605,929 | 9/1971 | Rolland | 280/DIG. 5 X |
| 3,713,502 | 1/1973 | Delaney et al. | 180/216 X |
| 3,777,836 | 12/1973 | Riza | 280/DIG. 5 X |
| 4,340,124 | 7/1972 | Leonard | 280/287 X |
| 4,448,437 | 5/1984 | Montague | 280/287 |
| 4,522,281 | 6/1985 | Snider | 180/208 |
| 4,570,739 | 2/1986 | Kramer | 280/DIG. 5 X |
| 4,598,923 | 7/1986 | Csizmadia | 280/287 |
| 4,792,149 | 12/1988 | Harmon | 280/231 |
| 4,852,898 | 8/1989 | Donoghue et al. | 280/287 X |

Primary Examiner—Margaret A. Focarino
Assistant Examiner—Victor E. Johnson
Attorney, Agent, or Firm—Anthony R. Lambert

[57] ABSTRACT

A light, portable golf riding apparatus that may be electric motor or pedal driven. The lightness of the apparatus is provided in part by using a tubular construction, with few, if any, panels, and portability is provided by having the apparatus formed from several sections or frameworks pivoting in relation to each other. In one embodiment, a first central section holds the power train and rear wheels, a front section holds the steering column, and a third a seat for the rider. The central and front sections pivot towards each other, the seat folds onto the central section and the steering collapses about the apparatus to form a compact body.

8 Claims, 6 Drawing Sheets

PORTABLE GOLF CART AND RIDING APPARATUS

FIELD OF THE INVENTION

This invention relates to portable riding apparatus and in particular to a portable golf cart.

BACKGROUND AND SUMMARY OF THE INVENTION

So far as known to the inventors, golf carts are typically cumbersome and entirely motor driven vehicles that are not easily transported and do not offer any form of exercise when ridden. Golf carts are usually fairly heavy and most golf courses keep a fleet of carts available for rental by patrons of the golf course, since they are simply not readily portable.

The inventors have proposed a light, portable golf riding apparatus that also in one embodiment offers optional human propulsion, in the case shown using foot driven pedals. The lightness of the apparatus is provided in part by using a tubular construction, with few, if any, panels, and portability is provided by having the apparatus formed from several sections or frameworks pivoting in relation to each other. In one embodiment, a first central section holds the power train and rear wheels, a front section holds the steering, and a third a seat for the rider. In one embodiment, the front section folds back upon the central section and the seat collapses onto the central section to make a compact and portable vehicle. Power is provided optionally by an electric motor or a free-wheeling pedal with chain attachment to the rear wheels.

Further elucidation of the invention may be found in the detailed description that follows and the claims forming a part of this patent document.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

Figure 1:
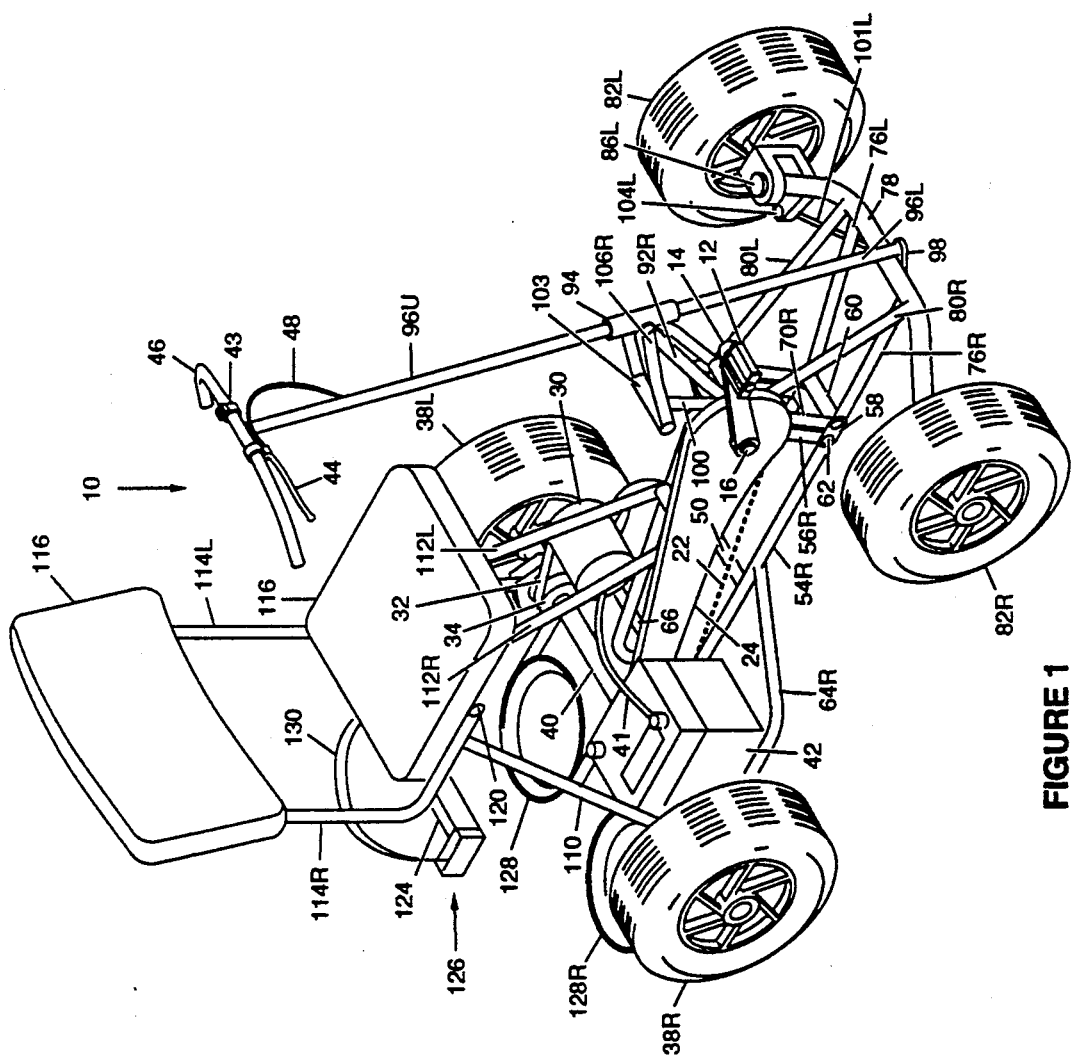
FIG. 1 is a front isometric view of a portable riding apparatus according to the invention.
Figure 2:
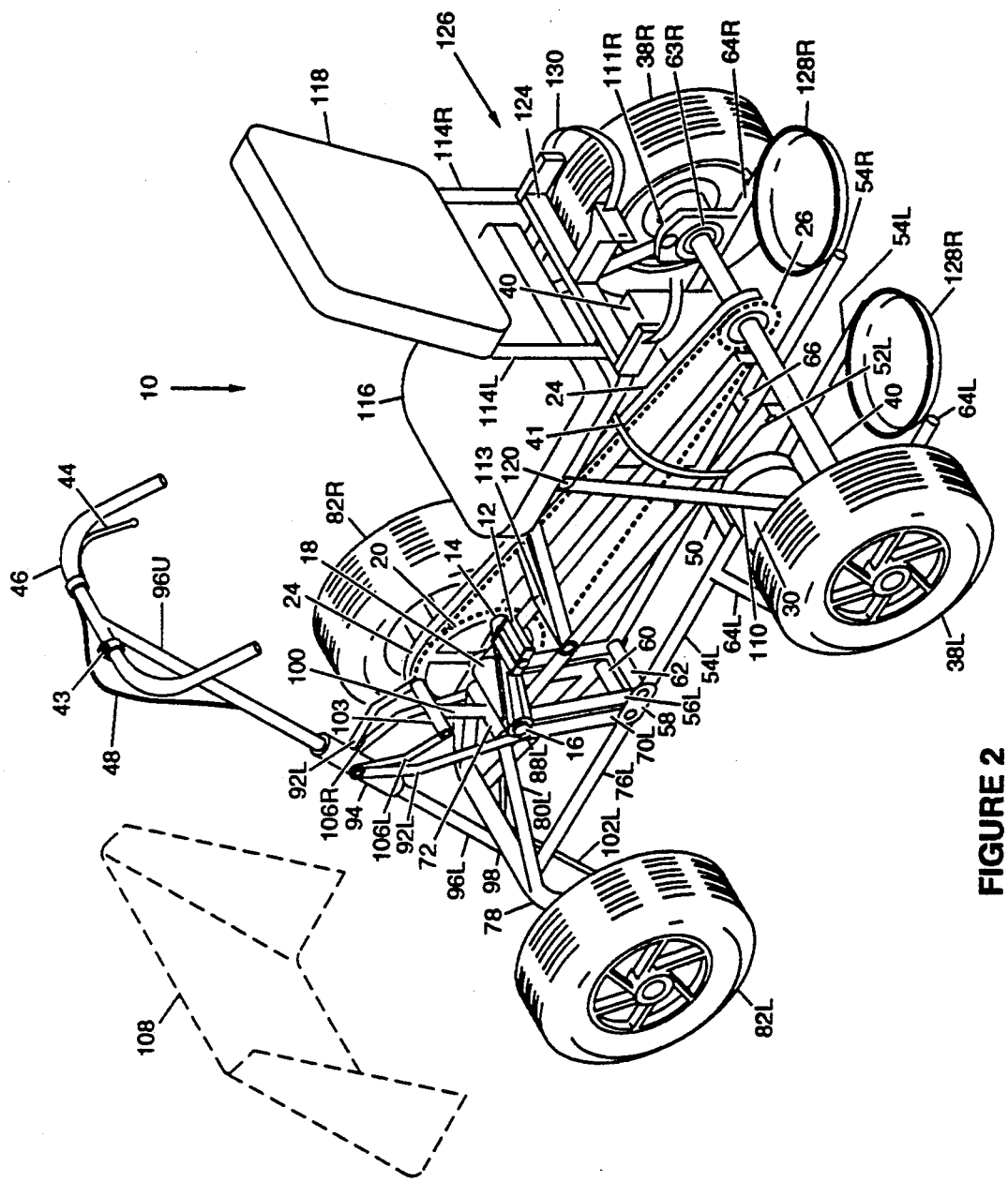
FIG. 2 is a rear isometric view of the portable riding apparatus of FIG. 1.
Figure 3:
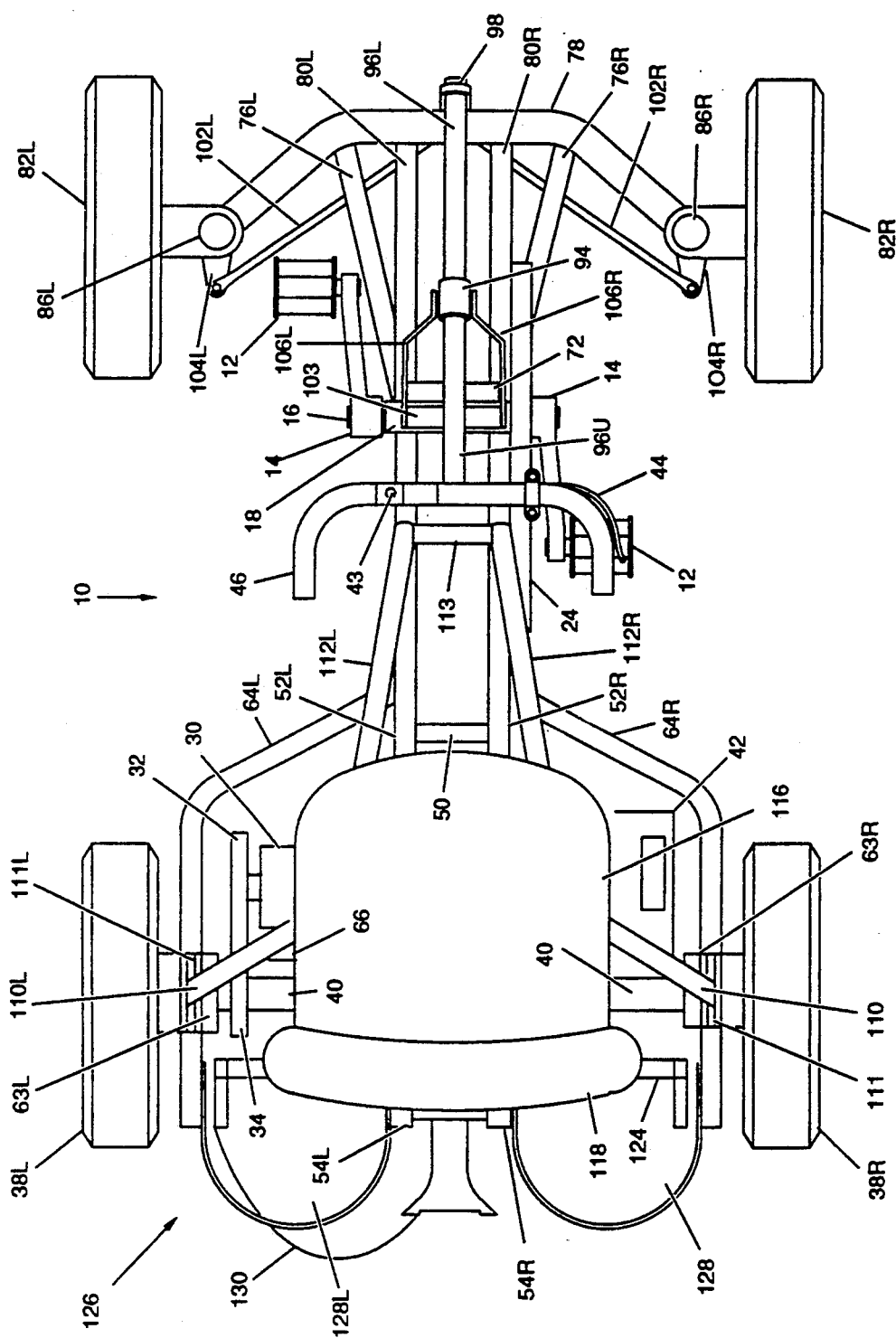
FIG. 3 is a top view of the portable riding apparatus of FIG. 1.
Figure 4:
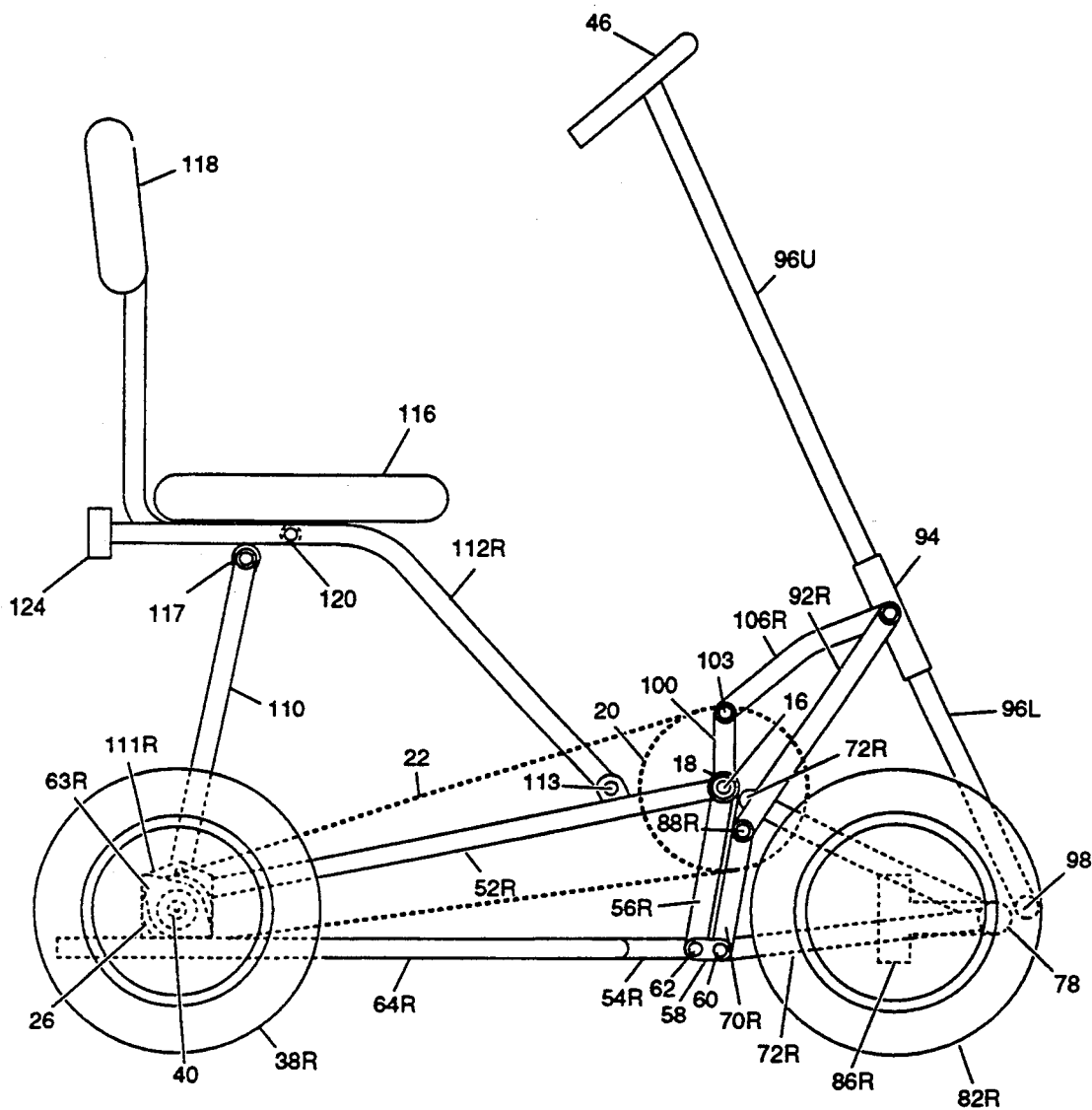
FIG. 4 is a side schematic of the portable riding apparatus of FIG. 1 ready for use.

Referring to FIGS. 1, 2 and 3 in particular there is shown a portable riding apparatus 10 according to the invention. The portable riding apparatus 10 is powered by a pedal set and an auxiliary electric motor. The pedal set is formed from pedals 12 on crank arms 14, with the crank arms being attached to opposed ends of a shaft 16 that is journalled in sleeve 18. A front sprocket 20 (best seen in FIG. 4) of conventional bicycle type design on one end of the shaft 16 engages a chain 22 the top part of which is enclosed within chain guard 24. The chain 22 runs rearward to a rear sprocket 26 that is operatively connected to a rear axle 40. As well known in the bicycle manufacturing art, it is preferable that the rear sprocket 26 be of the free wheel type such that upon discontinuation of pedalling while the vehicle is in motion, the rear wheels do not drive the pedals 12. A 12V traction type electric motor 30 best seen in FIG. 3 drives a conventional belt drive 32 that engages a grooved drive wheel 34 that is fixed on rear axle 40. Rear axle 40 connects to the left rear wheel 38L on one end and to the right rear wheel 38R at the other end. A conventional lead acid battery 42 may be used to provide power for the drive motor 30 through cable 41. The drive motor 30 is controlled by push button control 43 on steering set 46 in conventional manner through cable 48. Braking is provided by lever 44 on steering set 46 that attaches to a conventional brake on the rear axle 40. The motor 30 is normally in the off position and pushing of the button 43 activates the motor 30.

The frame of the portable riding apparatus includes three main parts: a central framework that supports the driving mechanism, including pedals, motor, battery, and rear axle and wheel set; a front framework that supports the front wheels and steering mechanism and a seat framework mounted on the central section that supports a seat for a rider. The central framework and the front framework together form a body for the portable riding apparatus.

The central rigid framework is formed on its right side (conventional right according to a person sitting in the vehicle and looking forward) by a right upper tube 52R that is connected on one end to the sleeve 18 at the front end of the central rigid framework and the other to a cross tube 66 adjacent the axle 40 at the rear portion of the central rigid framework. A right center tube 56R extends downward from the sleeve 18 and connects to a pivot point 58, formed of a linked pair of rods 60 and 62. A right lower tube 54R extends rearward from the pivot point 58 to and beyond the cross tube 66 adjacent the axle 40. A mirror image of the right side forms the left side to the central rigid framework, with the sleeve 18, cross tube 66 and forward connecting rod 62 connecting the left and right sides. Elements on the right side are given the reference suffix R, and like elements on the left side are given the reference suffix L. Lateral tubes 64L and 64R connect between the left and right lower tubes 54L and 54R respectively and the cross tube 66 adjacent respective rear wheels 38L and 38R. The axle 40 is supported for rotation by bearings 63L and 63R that are mounted on the left lateral tubes 64L and 64R respectively. The left lower tube 54L and right lower tube 54R together form a lower portion of the central rigid framework. A plate may extend between the left lower tube 54L and the left lateral tube 64L under the motor 30 to form a support surface for the motor 30, or the motor may be bolted directly to the tubes 54L and 64L and cross tube 66. A brace between the left lower tube 54L and right lower tube 54R is provided by tube 50.

Figure 5:
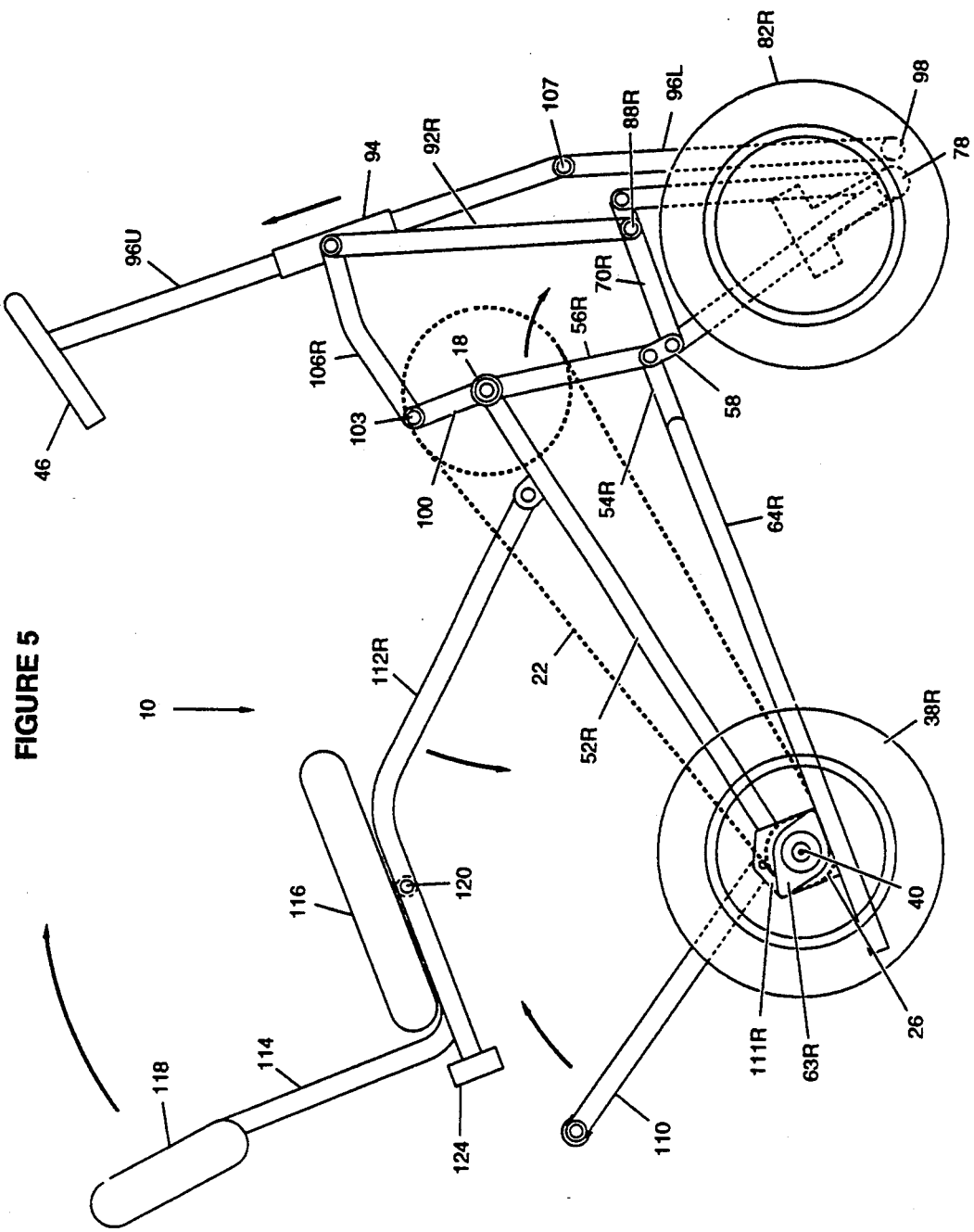
FIG. 5 is a side schematic of the portable riding apparatus of FIG. 1 partially folded.
Figure 6:
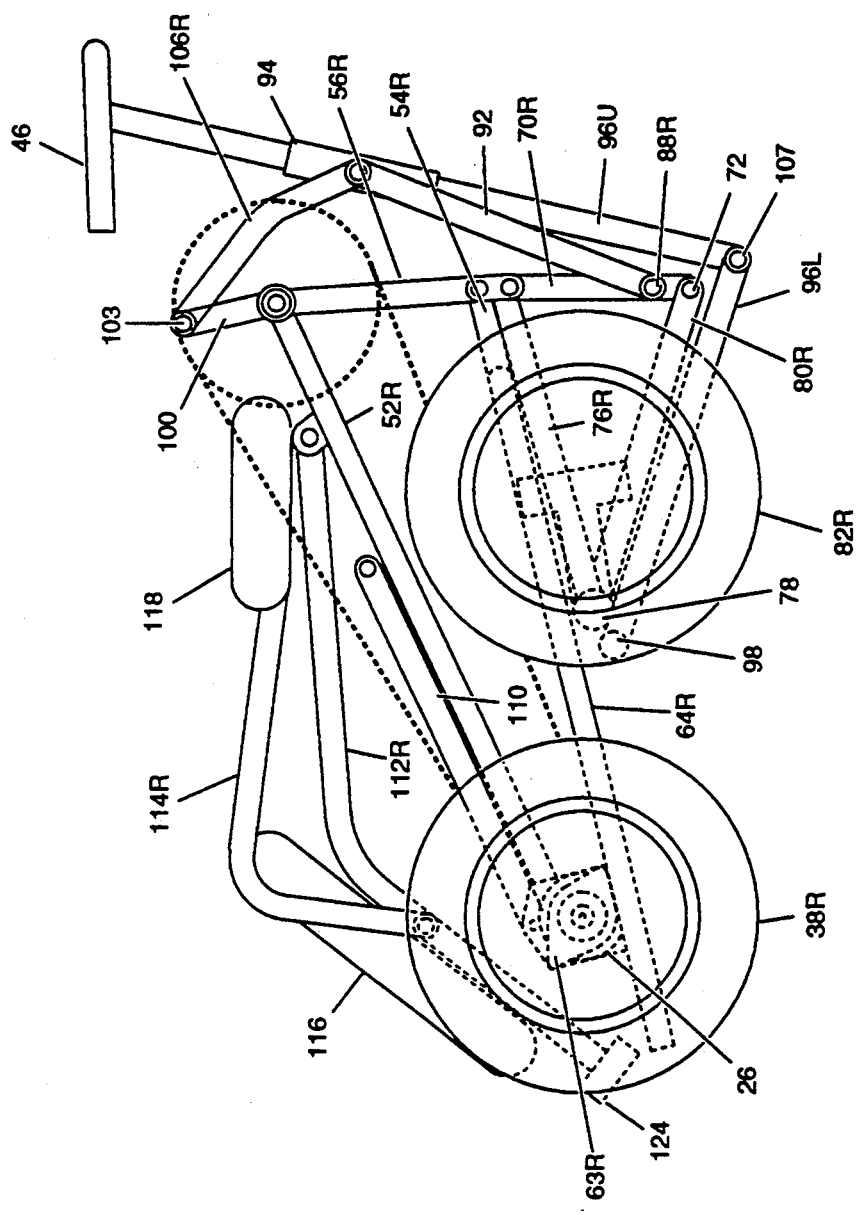
FIG. 6 is a side schematic of the portable riding apparatus of FIG. 1 fully folded.

The front rigid framework is formed from a right rear tube 70R that extends between rod 60 at pivot 58 and a connector 72. The connector 72 may be formed of a tube as shown or an arcuate plate that conforms to the outside surface of the sleeve 18, and the connector 72 and sleeve 18 may be locked together with any of various suitable locking means such as a toggle clamp fastened to the connector 72 that engages a groove or lip on the sleeve 18 or with a pin (not shown) or the like that is received by loops on the connector 72 and sleeve 18. The front rigid framework pivots about the pivot 58 as shown in FIGS. 5 and 6 on release of the locking means at the sleeve 18 and is held firmly against the sleeve 18 when the locking means is engaged. The front rigid framework also includes a right lower front tube 76R extending forward from the pivot 58 to a steering frame 78. A right upper front tube 80R extends between the steering frame 78 to the connector 72. The left side of the front rigid framework is a mirror image of the right side, and together with the connector 72, rod 60 forming part of pivot 58 and steering frame 78 form a rigid section. The left lower front tube 76L and the right lower front tube 76R together form a base portion for the front rigid framework.

A front wheel set is attached to the frame 78 on the front rigid framework that includes wheels 82L and 82R each pivotally attached to the frame 78 at pivots 86L and 86R respectively. Extending upward from and pivotally connected to the right rear tube 70R and left rear tube 70L at points 88R and 88L respectively (or to either side of the connector 72) is a right steering column support 92R and a left steering column support 92L. The supports 92R and 92L are pivotally attached to either side of the steering sleeve 94. A short vertical tube 100 extends vertically and rigidly from sleeve 18 and terminates in a T-bar 103 forming a pivot point. Two elbows 106L and 106R are pivotally connected to and extend from left and right sides respectively of the T-bar 103 to the sleeve 94. A collapsible steering column 96 formed of an upper part 96U and a lower part 96L having a pivot point 107 (see FIG. 5) at the point of connection of the two parts passes through the sleeve 94 to a pivot point 98 attached to the steering frame 78. As shown better in FIGS. 5 and 6, when the portable riding apparatus is set up for use, the pivot point 107 is held within the sleeve 94 and the steering column is prevented from collapsing by the sleeve 94.

Left and right rods 102L and 102R respectively connect the extreme lower end 96L of the steering column 96 to steering arms 104L and 104R rigidly attached to the wheels 82L and 82R respectively. Rotation of the steering column 96 turns the wheels in known manner. The steering column 96 terminates at its upper end 96U in the steering set 46. Optionally, a shield 108 may be attached to the front rigid framework to protect the rider from spray or debris.

The seat framework is formed of a rear U-shaped support 110 (not shown in FIG. 3 but see the other Figures) pivotally attached at its left and right ends to left and right brackets 111L and 111R respectively mounted on lateral tubes 64L and 64R respectively adjacent the bearings 63L and 63R of the axle 40, and a pair of arms 112L and 112R that are joined together at one end by a bar 113 whose ends are pivotally connected to the left and right upper tubes 52L and 52R respectively near the sleeve 18. The arms 112L and 112R extend upward and rearward from the pivoting bar 113 to a seat 116. The arms 112L and 112R support the seat 116 with back rest 118 attached to the ends of arms 114L and 114R. The arms 112L and 112R and arms 114L and 114R respectively connect at points 120 under the seat 116. The arms 112L and 112R are fixed to the seat 116 while the arms 114L and 114R are fixed to the back rest 118 and are pivotally connected to the points 120. In normal use the arms 114L and 114R and hence the back rest 118 may be supported by the U-shaped support 110 or, as shown, a frame 124 affixed to the seat 116. The U-shaped support 110 releasably attaches to the rear of the seat 116 using any of several known releasable fastening methods such as a U-shaped connector 117 (FIG. 4) fixed to the base of the seat or the like. The arms 112L and 112R, together with the support 110 support the seat 116 in fixed position in relation to the central framework.

Each of the load bearing tubes and braces is preferably tubular, though not necessarily round, and made of lightweight and strong material such as aluminum or one of the many light alloys used in bicycle construction. The respective tubes are preferably welded together in accordance with known techniques. The supports 92L and 92R and the elbows 106L and 106R may be made of flat metal bars since they are not load bearing. The pedals are conventional bicycle pedals. The wheels are chosen for the particular purpose intended, and in the case of a golf cart may be slightly larger than conventional golf cart wheels, with a wide tread to avoid damage to the fairways. The wheels shown are 8" pneumatic tires on plastic moulded rims. The seat may be made to be adjustable in height.

The portable riding apparatus is primarily intended for use as a golf cart, but has other uses. When used as a golf cart, upper supports 126 complete with conventional straps 130 may be attached to frame 124 and lower supports 128R and 128L may be attached respectively between the ends of tubes 54R, 64R and 54L, 64L at the rear of the portable riding apparatus for retaining golf bags in conventional manner. Provision may also be made for carrying refreshments. However, the portable riding apparatus has other uses, for example use by the disabled, in which case the golf bag supports may be replaced by other suitable supports, as for example groceries.

The manner of operation of the riding apparatus is as follows. Removal of the clamp, pin or the like locking means holding the connector 72 to the sleeve 18 allows the front rigid framework to rotate in relation to the central rigid framework from the position shown in FIG. 4 in which the front framework is forward of the central framework through the position shown in FIG. 5 to the position shown in FIG. 6 in which the lower portion of the central framework is adjacent the base portion of the front framework. By this means the body of the portable riding apparatus is foldable about a central axis between the front and rear wheel sets that is parallel to the rear axle 40 (that is, the axis is horizontal and lateral, or perpendicular to both the forward and vertical directions).

As the front section rotates under the central section, the steering column 96 slides downward in sleeve 94 until the pivot point 107 on the steering column is clear of the sleeve 94 and sliding on the steering column upper part 96U, at which point the steering column may then be collapsed about the apparatus. To accommodate this movement of the sleeve 94, the supports 92L and 92R and the elbows 106L and 106R rotate about their respective pivots 88 and 103.

By release of the releasable fastener, the U-shaped support 110 may be detached from the seat 116 and rotated rearward away from the seat 116 as shown in FIG. 5. The arms 112L and 112R then rotate downward about pivot bar 113 on the tubes 52L and 52R, thus collapsing the seat from its fixed position (FIG. 4) onto or close to the central rigid framework as shown in FIGS. 5 and 6. Also as shown in FIG. 5, the support 110 may then rotate forward into the position shown in FIG. 6 in which it rests on top of the seat 116. The steering column folds about the pivot 107 as shown in FIGS. 5 and 6 to wrap around the collapsed riding apparatus. By this means, a compact portable four wheeled vehicle may be obtained, that may easily be transported in the rear of a hatchback sedan.

Alternative Embodiments

A person skilled in the art could make immaterial modifications to the invention described and claimed in this patent without departing from the essence of the invention.

The embodiments of the invention in which an exclusive property or privilege is claimed are defined as follows:

1. A portable riding apparatus for a person comprising:
    a central rigid framework having a front and rear portion and a lower portion, the front and lower portions meeting at a first pivot point, a rear axle and wheel set being attached to the rear portion of the central framework;
    a front rigid framework incorporating a front wheel set and having a base portion having a rear end, the rear end being pivotally connected to the first pivot point on the central rigid framework whereby the front rigid framework is rotatable in relation to the central rigid framework from a first position forward of the central rigid framework to a second position diametrically opposed to the first position in which the base portion of the front rigid framework is adjacent and parallel to the lower portion of the central rigid framework;
    a seat framework attached to the central rigid framework, the seat framework having a seat and a support for supporting the seat in extended position in relation to the central framework;
    a steering mechanism including a steering column pivotally attached to the front rigid framework and having a central pivot point;
    a sleeve slidably disposed about the steering column;
    first and second supports each having a sleeve end and a framework end, the first and second supports being pivotally connected to the sleeve at their respective sleeve ends, the first and second supports being pivotally connected at their respective framework ends to the front rigid framework and to the second rigid framework respectively;
    the respective framework ends of the first and second supports being separated from each other and the central pivot point being enclosed by the sleeve when the front rigid framework is in the first position relative to the central rigid framework;
    whereby the sleeve and the first and second supports form a sliding support for the steering column and upon folding of the front rigid framework about the central rigid framework the central pivot point of the steering mechanism slides out of the sleeve, permitting the steering column to fold about the central rigid framework; and
    drive means for enabling a rider to cause the apparatus to move.

2. The portable riding apparatus of claim 1 in which the seat framework is pivotally attached to the central rigid framework and movable from the extended position, away from the central rigid framework, to a position adjacent to the central rigid framework.

3. The portable riding apparatus of claim 1 in which the drive means includes a pedal set and an electric motor.

4. The portable riding apparatus of claim 2 further including a back rest pivotally attached to the seat framework and being rotatable from a support position to a position resting on the seat framework.

5. In a portable riding apparatus having a body, front and rear wheels attached to the body on front and rear axles respectively, a drive mechanism operatively connected to the rear wheels, a seat supported on the body for a rider and a steering mechanism operatively connected to the front wheels, the improvement comprising:
    the body being rotatably foldable about a horizontal lateral axis lying on a line connecting the front and rear axles;
    a steering mechanism including a steering column pivotally attached to the body and having a central pivot point;
    a sleeve slidably disposed about the steering column;
    first and second supports each having a sleeve end and a body end, the first and second supports being pivotally connected to the sleeve at their respective sleeve ends;
    the first and second supports being pivotally connected at their respective body ends to the body at spatially separated points;
    the sleeve enclosing the central pivot point when the front rigid framework is in the first position relative to the central rigid framework;
    whereby the sleeve and the first and second supports form a sliding support for the steering column and upon folding of the body the central pivot point of the steering mechanism slides out of the sleeve, permitting the steering column to fold about the body.

6. In the portable riding apparatus of claim 5, the improvement further comprising the seat being pivotally connected to the body and being foldable in relation to the body from an extended position away from the body to a position adjacent to the body.

7. In the portable riding apparatus of claim 6, the improvement further comprising the drive means including a pedal set and electric motor.

8. In the portable riding apparatus of claim 7, the improvement further comprising:
    a back rest pivotally attached to the seat and being rotatable from a support position to a position resting on the seat.

* * * * *